United States Patent [19]

Ozveren et al.

[11] Patent Number: 6,046,982

[45] Date of Patent: *Apr. 4, 2000

[54] METHOD AND APPARATUS FOR REDUCING DATA LOSS IN DATA TRANSFER DEVICES

[75] Inventors: Cuneyt M. Ozveren, Fremont, Calif.; Ernest Grella, Shrewsbury, Mass.; Jeffrey L. Cooper, Gardner, Mass.; Jerry D. Hutchison, Littleton, Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,273

[22] Filed: Mar. 18, 1997

[51] Int. Cl.[7] .................................. H04J 1/16; H04J 3/16; H04L 12/28
[52] U.S. Cl. ........................... 370/232; 370/412; 370/468
[58] Field of Search ................................ 370/229, 230, 370/232, 235, 352, 359, 360, 366, 368, 371, 375, 378, 380, 381, 382, 395, 398, 412, 413, 414, 415, 416, 417, 418, 419, 420, 428, 458, 461, 462, 468; 395/728, 732, 849, 865, 872, 873, 200.68, 200.71; 711/147, 148, 149, 150, 154, 155, 156; 710/29, 33, 34, 35, 52, 53, 57, 240, 241

[56] References Cited

U.S. PATENT DOCUMENTS

| | | |
|---|---|---|
| 5,072,363 | 12/1991 | Gallagher . |
| 5,157,654 | 10/1992 | Cisneros . |
| 5,276,842 | 1/1994 | Sugita . |
| 5,276,887 | 1/1994 | Haynie . |
| 5,301,333 | 4/1994 | Lee . |
| 5,394,397 | 2/1995 | Yanagi et al. ............................ 370/395 |
| 5,436,886 | 7/1995 | McGill .................................... 370/395 |
| 5,438,666 | 8/1995 | Craft et al. . |
| 5,440,698 | 8/1995 | Sindhu et al. . |
| 5,517,495 | 5/1996 | Lund et al. .............................. 370/413 |
| 5,553,061 | 9/1996 | Waggener, Jr. et al. . |
| 5,577,035 | 11/1996 | Hayter et al. ........................... 370/395 |
| 5,619,495 | 4/1997 | Yamanaka et al. ..................... 370/413 |
| 5,696,764 | 12/1997 | Soumiya et al. ........................ 370/395 |
| 5,748,629 | 5/1998 | Caldera et al. ......................... 370/413 |
| 5,787,086 | 7/1998 | McLure et al. ......................... 370/413 |
| 5,805,577 | 9/1998 | Jain et al. ................................ 370/234 |
| 5,818,818 | 10/1998 | Soumiya et al. ........................ 370/395 |
| 5,838,677 | 11/1998 | Kozaki et al. ........................... 370/428 |

*Primary Examiner*—Chi H. Pham
*Assistant Examiner*—Steven Nguyen
*Attorney, Agent, or Firm*—Wolf, Greenfield & Sacks, P.C.

[57] ABSTRACT

The input bandwidth of a data transfer device is increased by altering the conventional memory arbitration method in which a data cell is stored and a data cell is forwarded during each data transfer cycle. The input data rate is monitored and when the input data rate exceeds the maximum average throughput of the memory, the outcome of the memory arbitration cycle is changed so that the memory arbitration cycle consists of two stores (memory write operations) instead of one store and one forward (memory read operation.) In effect, the input memory arbitration process steals cycles from the output memory arbitration process when the input load exceeds that of the maximum average memory throughput. In accordance with one embodiment, the input data rate is monitored by examining input port FIFO buffers for the presence of data cells waiting for storage. Based on the results of the FIFO monitoring and the outcome of the current port arbitration cycle, a decision is made on the following port arbitration cycle whether to change the normal memory arbitration pattern.

29 Claims, 6 Drawing Sheets

METHOD AND APPARATUS FOR REDUCING DATA LOSS IN DATA TRANSFER DEVICES

FIELD OF THE INVENTION

This invention relates, in general, to data transfer devices and specifically to methods and apparatus useful in shared memory devices for reducing packet or cell loss in store and forward operations.

BACKGROUND OF THE INVENTION

Computer hardware is becoming increasingly distributed and remote, resulting in networks of computers for solving problems in concert rather than as stand-alone systems. Although such distributed "services" networks generally facilitate problem-solving, they also increase the need for flexibility and functionality in software programs operating on the computers.

An example of a distributed services computer network is a "client-server" system which comprises a collection of client nodes, e.g., workstations or personal computers, that communicate over a network with various server nodes. Each node is connected to the transmission medium at an address which uniquely identifies the node and which is used to route data from one node to another. The server nodes are typically computers having hardware and software elements that provide a sophisticated set of services, or operations, for use by the client nodes to increase the efficiency of their own operations. Several types of networks may be employed in the client-server system which are connected by one or more communication links that may be interconnected to other communication links and nodes within the network through bridges or routers.

Nodes coupled to the network typically communicate by exchanging messages which comprise discrete "packets" of data. These packets can be transported over the network with one of a variety of transport techniques. Asynchronous transfer mode (ATM) is a relatively new data transport technique in which the network transports and switches short, fixed-length units of information, called "cells". In applications utilizing ATM, data packets to be transported are first broken up into ATM cells, transmitted, and then reassembled at a destination. In accordance with current protocol, ATM cells are 53 bytes long. Each cell consists of a 5-byte header and a 48-byte information field. The header of an ATM cell contains the information used to transport the cell from one node to the next over a route which has been previously established by means of a separate signaling channel. User data is contained in the remaining 48 bytes.

The preestablished route over which the cells pass exists only as sets of routing tables held in each network node or switch, which tables determine the physical connection of the communication links. These routing tables are based on a virtual circuit identifier (VCI) code and a virtual path identifier (VPI) code contained in header of each ATM cell. When a virtual path is established, each node (or switch) is provided with a set of lookup tables that identify an incoming cell by the VCI and VPI codes in the header and then route it through the node to one of a plurality of output lines, so that the cell is sent to the proper connection and, ultimately, the proper destination.

In this manner, a cell is passed through each ATM switch and over each communication link via the pre-established route, but the route is considered "virtual" since the route carrying the cell is dedicated to it only while the cell traverses it. The physical facilities are shared among various routes. For example, two cells that are ultimately headed for different destinations may be sequentially carried for part of their journey over the same physical wire.

An important design objective in data packet or switch networks is controlling the flow of cells so that they do not arrive at communication links or switches at a faster rate than they can be processed and forwarded to the next destination. For example, a typical ATM switch acts as a cell relay. The input side of the switch contains a first in-first out buffer (FIFO) queue connected to the media input port. Cells arrive from the incoming communication link at an input data rate and are entered into one end of the buffer. The switching process involves examining each cell in turn at the other end of the buffer and determining from the VCI/VPI codes in the cell header which output line should be used. The cell is then added to a FIFO buffer queue for that output line which holds cells waiting to be transmitted on the associated outgoing communication link.

Switch congestion occurs when either the input or output FIFO buffers fill to a predetermined level. If the congestion becomes severe enough, the buffers may become completely full, in which case there is no space for incoming packets or cells to be stored and the packets or cells are lost. The cell loss problem is exacerbated because the flow of cells on the network is generally "bursty" in nature rather than steady. Most network applications operate independently of each other and generate a "burst" of data in response to some event such as a certain time of day or a user action. An example of a user action which generates network traffic is the generation of a "copy command" which starts a process that results in a data file being transported across the network. Such a copy command might generate one or many packets on a LAN which are eventually switched onto a backbone which connects to another LAN. For example, a typical Ethernet LAN packet of 1000 bytes would appear on the ATM backbone as a 60 microsecond burst of roughly 21 ATM cells.

Often, such bursts are widely separated from the previous and next burst of cells because the bursts are caused by independent events. Consequently, the average data rate, which is often calculated over the period of many milliseconds, can include much idle time and be much less that the peak data rate during a burst. However, in order to minimize cell loss, network devices are designed to accommodate the peak data rate of common traffic patterns. A common prior art technique is to design network equipment to be able to handle the expected peak data rate for unlimited time periods. This technique is effective but results in equipment which has expensive capacity that is not needed most of the time.

A typical switch design, for example an ATM network, uses a shared memory switch. In this type of switch, received cells at each of the input ports are demultiplexed (if necessary) and put onto queues located in a common cell memory. These queues take the form of linked lists in the common memory. Buffer memory is effectively allocated from the common memory pool as it is needed so that the output buffers which are represented by the queues can be of different lengths. Thus, the switch receives cells from a media input port and stores them in memory. Concurrently, the switch reads cells from the memory and forwards them to an output port for transmission on a medium. The memory is sized to buffer a sufficient number of cells in order to handle the bursty nature of the cell flow in the network. Such a memory typically has an input bandwidth which indicates the rate at which cells are stored and an output bandwidth which indicates the rate at which cells are forwarded. The overall memory throughput is generally the average of the input and output bandwidths.

Dual ported memories are commonly used for the common memory pool so that one memory port is used to store cells in the memory while the other memory port is used to forward cells out of the memory. However, a dual-port memory design requires arbitration between the input and output ports because the physical memory element cannot be simultaneously written and read. The cells are transferred much more quickly inside the switch than their arrival rate at the switch. Since each cell that arrives must also be forwarded, the shared memory element typically uses a round robin arbitration scheme between the input and output ports. In a traditional shared memory switch, round robin arbitration among the input and output ports results in a sequence of operations alternating between memory-write (cell store) and memory-read (cell forward). In addition, a round robin arbitration scheme is also used between the various input or output ports since only one input port can store at once and only one output port can read at once.

Since cells may arrive simultaneously at all input ports and there is a small process delay prior to storing the cell in the shared memory, a small first in-first out (FIFO) buffer is provided at each input port to the switch. The size of each input FIFO is normally very small, since the cost/bit of the FIFO buffer memories is high when compared to the cost/bit of the main shared memory. Cells that arrive from one input port are entered into one end of the FIFO input buffer connected to that port. The switching process involves examining each cell, in turn, at the other end of the FIFO input buffer and determining from the routing codes in the cell header which output port should be used. The cell is then added to a buffer queue in the main shared memory for that output port.

Such shared memory switches make efficient use of memory capacity. However, in a transient cell burst situation, it is possible for the input FIFO's to overload, resulting in input congestion and cell loss. Consequently, such a switch was conventionally designed to prevent the input FIFO's from overloading. This was accomplished by designing the shared memory so that its bandwidth exceeded the sum of the data rate input and output cell rates at all times, including peak loads.

SUMMARY OF THE INVENTION

In accordance with the principles of the invention, during periods of input congestion, the input bandwidth of a data transfer device is increased, and the output bandwidth of the device is decreased by altering the conventional memory arbitration method. The input data rate is monitored and when the input data rate exceeds the maximum average throughput of the memory, the outcome of the memory arbitration is changed so that the data transfer cycle consists of two stores (memory write operations) instead of one store and one forward (memory read operation.) In effect, memory output operations are stolen to increase the number of memory input operations when the input load exceeds that of the maximum average memory throughput.

The input load is detected by monitoring the input port FIFO buffers for the presence of data cells waiting for storage. Based on the results of the FIFO monitoring and the outcome of the current port arbitration cycle, a decision is made on the following port arbitration cycle whether to change the normal memory arbitration pattern.

In accordance with a preferred embodiment, the input ports are assigned to two separate controllers and a single arbitration circuit is used to arbitrate between ports on both of the controllers.

DETAILED DESCRIPTION OF SPECIFIC EMBODIMENTS

Figure 1:
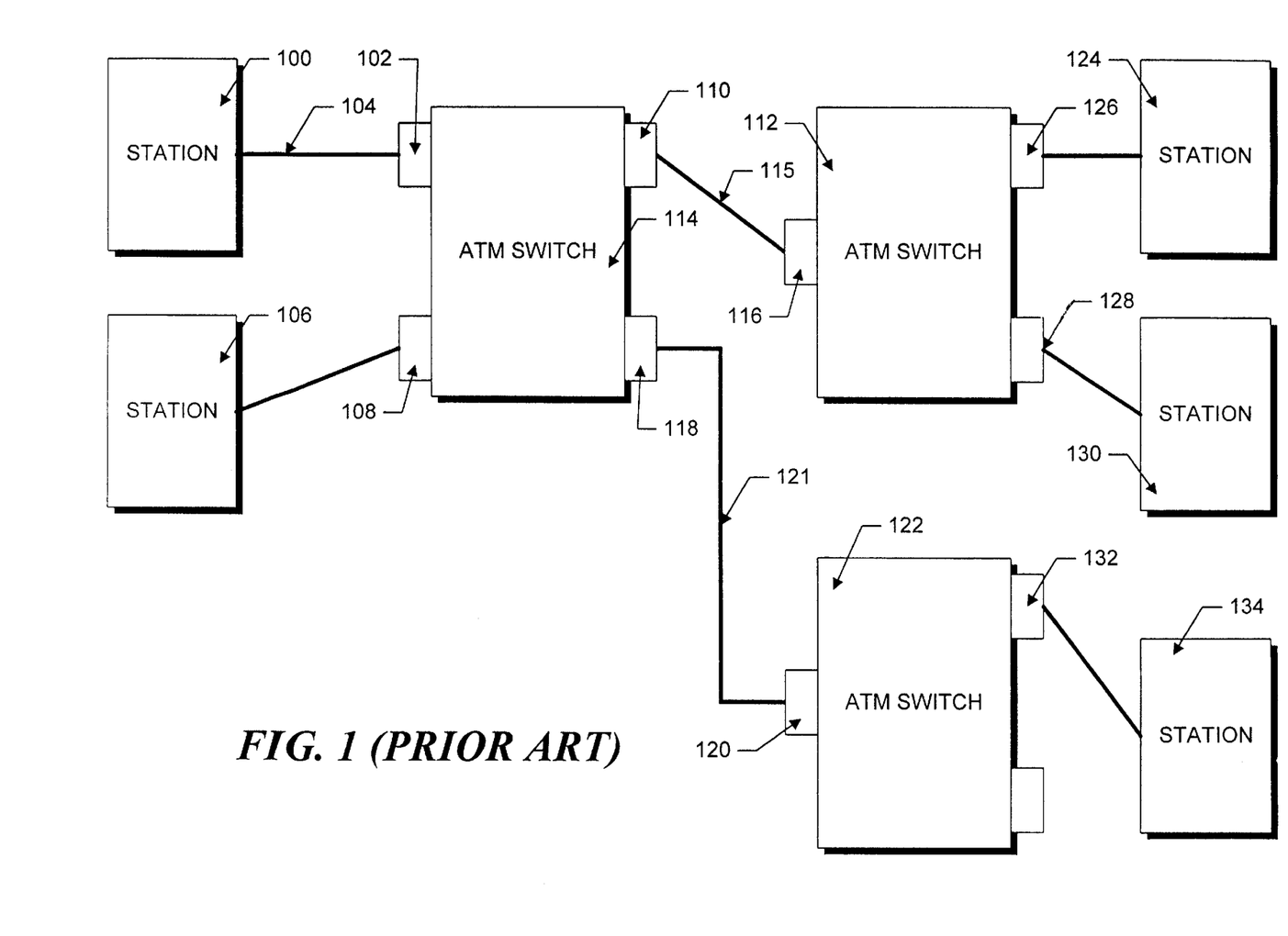
FIG. 1 is a block schematic diagram of an ATM switching network illustrating the connection of switches

FIG. 1 illustrates, in very generalized form, an ATM switched network involving five stations 100, 106, 124, 130 and 134, respectively. In such a network, each station 100, 106, 124, 130 and 134 contains software which breaks the data into cells and affixes an appropriate header indicating how each cell should be routed through the network. Each station also contains software which receives cells and reassembles the packets into the completed data packets. Although an ATM switching network utilizing cells is illustratively shown and described in the examples which follow, the principles of the present invention can also be used with other types of data packet networks and packet switches. The use of an ATM switch is in no way intended to imply that the invention is limited to such switches.

Stations 100 and 106 are connected to ATM cell switch 114, and stations 124 and 130 are connected to switch 112. Similarly, station 134 is connected to switch 122. An arbitration method and apparatus constructed in accordance with the principles of the present invention can run in switches 112, 114 and 122. Switches 112, 114 and 122 route cells between the stations 100, 106, 124, 130 and 134 and control access to the network. For example, station 100 may send cells over media line 104 to media input port 102 of switch 114. Switch 114 may route cells to a destination station, for example station 124, based on the information in each cell header. To do this, cells are first switched by switch 114 onto output line 115, via output port 110 to input port 116 of switch 112. Switch 112 then routes the cells, via output port 126 to station 124. Similarly, station 106 can be connected to station 134 by means of input port 108 on switch 114, output port 118, communication line 121, input port 120 of switch 122 and output port 132. Although only a few input and output ports are shown on switches 112, 114 and 122, typically, each switch would have many input and output ports, for example eight input ports and eight output ports.

Each ATM switch, for example switch 114, acts as a cell relay. In the event that ATM cells flow, for example, from station 100 to station 134, the input side of the switch contains a first in-first out (FIFO) buffer queue connected to each of the media input ports 102 and 108. Cells arrive from the incoming communication link 104 and are entered into one end of the buffer. The switching process involves examining each cell, in turn, at the other end of the buffer and determining from the routing codes in the cell header which output line should be used. The cell is then added to a FIFO buffer queue for that output line which holds cells waiting to be transmitted on the associated outgoing communication links 115 or 121. It is important that the switching process operate efficiently because data packets can arrive at closely spaced intervals. Switch congestion occurs when either the input or output FIFO buffers fill to a predetermined level. If the congestion becomes severe enough the buffers may become completely full, in which case there is no space for incoming packets to be stored and the packets are lost.

A conventional data transfer cycle involves two steps, one store operation followed by one forward operation. In the preferred embodiment, the store operation is a 53-byte memory write operation and the forward operation is a 53-byte memory read operation. In accordance with the invention, when input congestion occurs, the arbiter uses a store/store cycle instead of a store/forward cycle. Thus, the present invention modifies the arbitration to temporarily increase the number of input operations while correspondingly decreasing the number of output operations.

Figure 2:
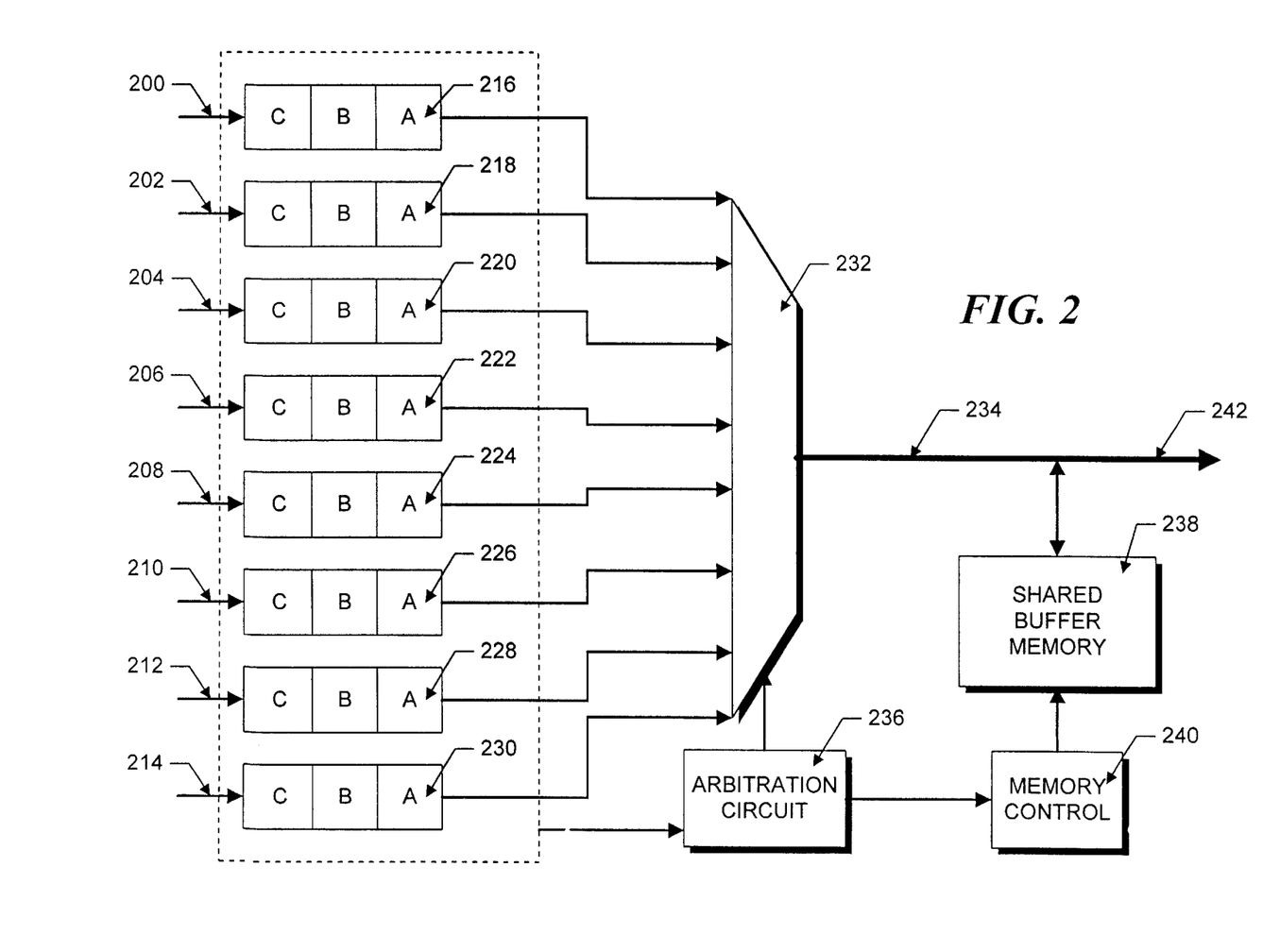
FIG. 2 is a more detailed block diagram of an ATM switch illustrating the input FIFOs, the arbitration circuitry and the shared memory.

FIG. 2 illustrates, in more detail, the construction, in accordance with the principles of the invention, of an ATM switch, such as switches 112, 114 or 122. Cells arrive on inputs 200–214 which are connected to input FIFOs 216–230, respectively. The outputs of FIFOs 216–230 are, in turn, connected to multiplexer 232 which is controlled by an arbitration circuit 236. As will hereinafter be described in detail, arbitration circuit 236 receives inputs from the FIFOs 216–230 in order to select the output of one of FlFOs 216–230 for forwarding.

The output of multiplexer 232 is connected to the common shared memory bus 234. Cells on the common bus 234 may be stored in an appropriate queue in the shared buffer memory 238 under control of memory control 240. Memory control 240 can also read cells out of memory 238 and transmit them, via the common bus 234 to output ports, not shown, which would be coupled via terminal 242.

As previously mentioned, the shared memory element 238 cannot be simultaneously written and read. Therefore a memory store/forward arbitration process is performed by arbitration circuit 236 to decide whether a write or a read will be performed at a given time. Memory arbitration involves selecting from two processes for each memory element, an input process which stores a cell in the shared memory 238 and an output process which reads a cell from the shared memory 238. As previously mentioned, round-robin arbitration occurs separately for memory input and output processes and, in accordance with the principles of the present invention, the memory input process is given priority which effectively allows short bursts wherein the entire memory system bandwidth is allocated to the input process. However, on average, the output bandwidth must equal or exceed input bandwidth for the central shared memory, or cell loss will occur. Since network cell arrival rates are very bursty, the peak rate which must be handled without loss is greater than the average rate. The matter is further complicated because, in the illustrative embodiment, there are eight input ports, 200–214, only one of which can store a cell in shared memory 238 at any given time. Therefore, another round robin port arbitration is used to select one input port for a store operation. This latter round robin port arbitration is controlled by arbitration circuit 236.

In the illustrative embodiment, a peak in the aggregate input data rate is detected in the input FIFOs 216–230 normally present for each port. This detection is performed by arbitration circuit 236. Conceptually, an input port needs to store a minimum of three cells in a FIFO, labeled (for purposes of discussion) cells A, B and C. The A cell is a cell which will be written to memory 238 if the associated port wins the input port arbitration cycle. The B cell is a cell which arrived after the A cell and must be buffered if the A cell has not been written. Depending on the embodiment, the B portion of the each FIFO might be absent or might hold one or more cells. The C portion of the FIFO holds a cell is currently still arriving from the serial media, so that the presence of this cell is detected only after it completely arrives.

Assuming the internal memory bandwidth is 1.6 Gb/s, given a store operation and a forward operation on each data transfer cycle, the throughput of the switch would be 800 Mb/s. A common port speed is sTS3c SONET, or 155 Mb/s. Therefore, if the switch has eight input ports, and all ports are inputting data simultaneously, the aggregate input data rate is 1.2 Gb/s, which exceeds the memory throughput. The memory controller can store and forward slightly more than five cells in the time it takes one 53 byte cell to arrive at a port. With eight ports, eight cells could arrive at once and occupy the eight A FIFO locations. Only five cells would be stored, emptying five of the A FIFO locations, before a ninth cell could arrive, possibly occupying a B FIFO location. Thus, if a port has a B cell stored in its FIFO when an arbitration cycle begins, it is an indication that a peak in the input data rate has occurred. In the illustrative embodiment, only one B cell can be stored per port. Therefore, the B FIFO location must be emptied before another cell arrival time lapses or FIFO overflow and cell loss may occur.

Accordingly, the arbitration circuit 236, or "arbiter", modifies the store/forward data transfer cycle to be store/store data transfer cycle when the peak in the input data rate is detected. When a cell is detected in any B FIFO location, priority is given to the input process, performing round-robin storing of all occupied A FIFO locations until the B FIFO location empties. If full memory bandwidth is used to store cells, the arbiter can empty ten of the A FIFO locations before another cell can arrive. Thus, for any arrival pattern, it is guaranteed that cells in B FIFO locations will be moved to A FIFO locations in time to prevent cell loss. An alternative implementation may have a FIFO with more stages, thereby allowing more than one cell to be stored of type B, and bandwidth sharing can be invoked only after a predetermined number of cells arrive.

Figure 3:
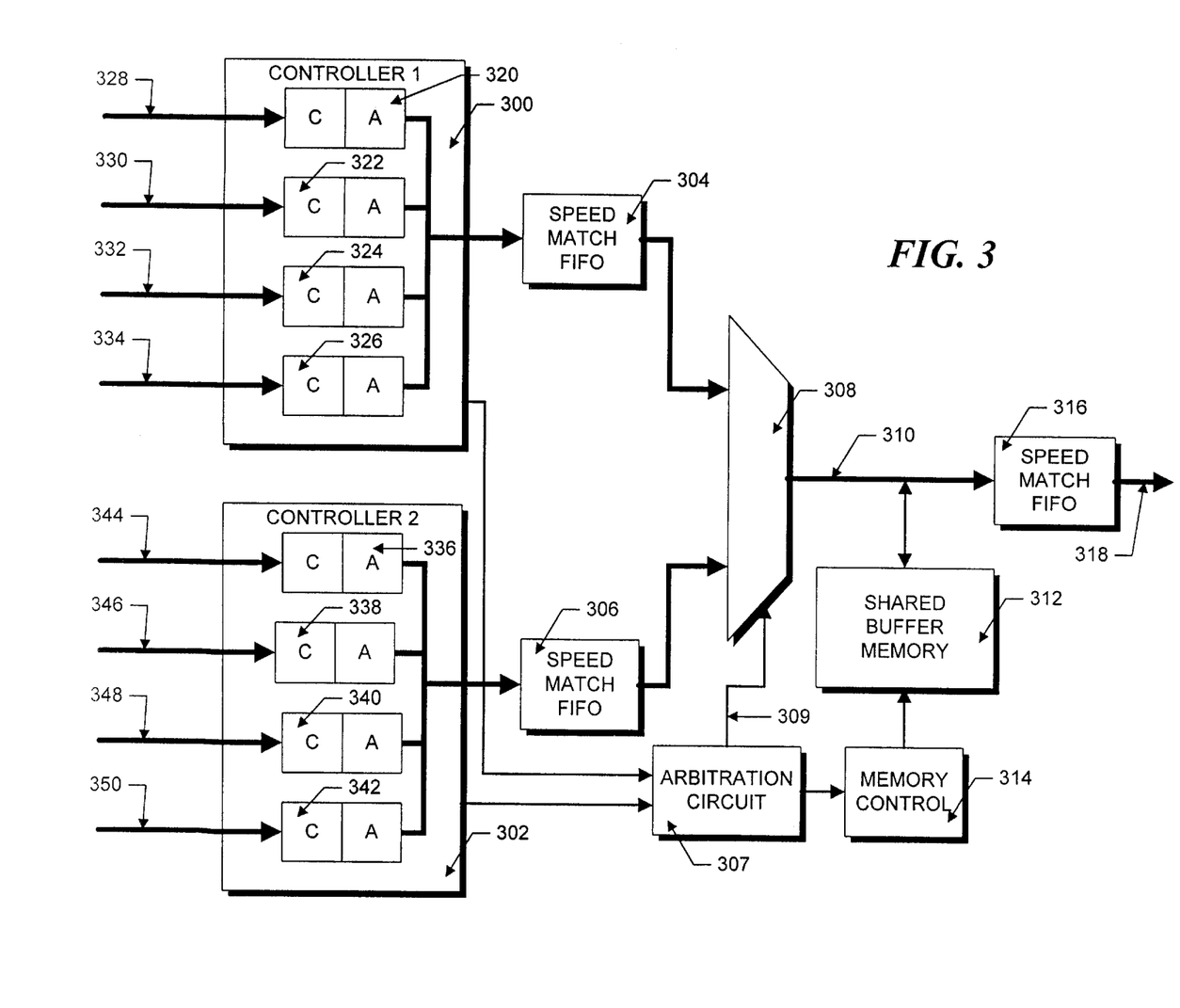
FIG. 3 is a more detailed block diagram of an ATM switch illustrating the input FIFOs, the arbitration circuitry and the shared memory in a preferred embodiment.

FIG. 3 illustrates a preferred embodiment of a cell switch constructed in accordance with the principles of the invention. The switch comprises two input controllers 300 and 302, which are designated as controller 1, 300, and controller 2, 302. The use of two controllers is not necessary for the principles of the present invention, but facilitates overcoming certain technology limitations of the hardware used to implement the described embodiment. The output of controller 300 is connected to a speed matching FIFO 304. Similarly, the output of controller 302 is connected to speed matching FIFO 306. Speed matching FIFOs 304 and 306 are illustrated for descriptive purposes only, and their function can be incorporated into controllers 300 and 302 by using the controller FIFOs.

The output of either FIFO 304 or FIFO 306 can be selected by means of a multiplexer 308 which is controlled by an arbitration circuit 307. As will hereinafter be described in detail, arbitration circuit 307 receives inputs from the controller 1, 300, and controller 2, 302, in order to select the output of one controller for storing.

The output of multiplexer 308 is connected to the common shared memory bus 310. Cells on the common bus 310 may be stored in an appropriate queue in the shared buffer memory 312 under control of memory control 314. Memory control 314 can also read cells out of memory 312 and transmit them, via the common bus 310 to output ports, not shown, that would be coupled at terminal 318. Another speed matching FIFO 316 is used to match the internal memory speed to the output port speed.

As previously mentioned, the shared memory element 312 cannot be simultaneously written and read. Therefore a memory (store/forward) arbitration process must be performed by arbitration circuit 307 to decide whether a write or a read will be performed at any given time. Memory arbitration includes two processes, an input process which stores a cell in the shared memory 312 and an output process which reads a cell from the shared memory 312. More particularly, a standard data transfer cycle is a store/forward cycle, and involves two steps, one store (memory write) operation followed by one forward (memory read) operation. When input congestion occurs, the memory arbitration of circuit 307 selects a store/store cycle instead of a store/forward cycle. This effectively allows short bursts wherein the entire memory system bandwidth is allocated to the input process. However, on average, the output bandwidth must equal or exceed input bandwidth for the central shared memory, or cell loss will occur. Since network cell arrival rates are very bursty, the peak rate which must be handled without loss is greater than the average rate. Another round robin port arbitration is used to select one input port for a store operation.

The switch has an aggregate input data rate which may be from a single port or, more commonly, from a plurality of parallel ports, as in the embodiments of FIGS. 2 and 3. Input congestion is caused when the aggregate input data rate exceeds the memory throughput of the device. In the illustrative embodiment, as in the embodiment illustrated in FIG. 2, input congestion is detected in the input FIFO's connected to each input port. As illustrated in FIG. 3, in the preferred embodiment, the B cell portion of the input FIFOs has been eliminated in order to further reduce costs. Arbitration and congestion detection functions may be based on the same cell, although this causes the store/store cycle to be needed more often than in the first described embodiment. In this case, the combined locations are labeled "A" for descriptive purposes. Congestion is detected by a technique which uses flags to pass information from arbitration cycle to arbitration cycle. Consequently, the input port FIFOs need to store a minimum of two cells, labeled A and C in FIFOs 320–326 and 336–342. The A locations are examined to decide which input port will write to shared memory 312 during the store portion of the memory arbitration cycle. The A portion of each input FIFO also contains the cell which will be written to the shared memory 312 if the associated port wins the arbitration. As with the previous embodiment, the C portion of the FIFO holds a cell which may be currently still arriving from the serial media, so that the presence of this cell is detected only after it completely arrives.

In the illustrative embodiment, decisions to schedule cell storing and forwarding are based on machine slot time of the memory control 314 instead of a cycle of length equal to the minimum time between arrival of cells. A machine slot time is the time needed to perform a data transfer cycle, i.e., a cell store and a cell forward or two cell stores. If each input port is a conventional 155 Mb/s serial port and the memory throughput (during normal store/forward operation) is 800 Mb/s, there will be approximately five machine slot times between each possible cell arrival. If the switch has eight ports, eight cells may arrive in the time required for roughly 5 cells to be written and input congestion can occur with the normal store/forward memory arbitration cycle.

In accordance with the principles of the present invention, when input congestion does occur, the normal store/forward data transfer cycle (which has a input bandwidth of 800 Mb/s) is modified to a store/store cycle (which has a input bandwidth of 1.6 Gb/s) so that ten cells can be processed for eight arrivals and the input process congestion will be cleared.

In the illustrative embodiment shown in FIG. 3, each of controller 300 and controller 302 are assigned four ports and each controller has logic to arbitrate with the other controller. During the arbitration cycle, each controller selects an occupied A FIFO section using round robin arbitration for each machine slot time. For example, if one of the port buffers for controller 300 contains a cell waiting for processing in an A cell FIFO portion, the controller 300 asserts a "cell valid" flag signal, 1_cv and controller 300 arbitrates with controller 302 for a chance to store the buffered cell into the shared memory 312. Similarly, if one of the port buffers for controller 302 contains a cell waiting for processing in an A cell FIFO portion, the controller 302 asserts a "cell valid" flag signal, 2_cv and the controller 302 arbitrates with controller 300 for a chance to store the buffered cell into the shared memory 312. If one or more port buffers on controller 300 are filled with cells waiting to be transferred, controller 300 asserts the 1_cv signal and arbitrates between port buffers to select one buffer based on a round robin arbitration method. After one buffer is selected, controller 300 then arbitrates with controller 302 to store the cell in the selected buffer in the shared memory 312. Controller 302 acts in a similar manner.

In accordance with normal operation, the result of the controller arbitration would result in a cell being stored in the shared memory 312. The store operation is then followed by a forward operation. The forward operation is a conventional operation which is not important for an understanding of the invention. A cell forward operation would occur when a cell is transferred from a queue in the shared memory 312 to an output port, such as would connect at terminal 318, via speed matching FIFO 316.

In accordance with the principles of the present invention, which an input congestion situation is detected, the normal memory arbitration method is altered so that multiple cells are stored resulting in a store/store outcome.

Figure 4:
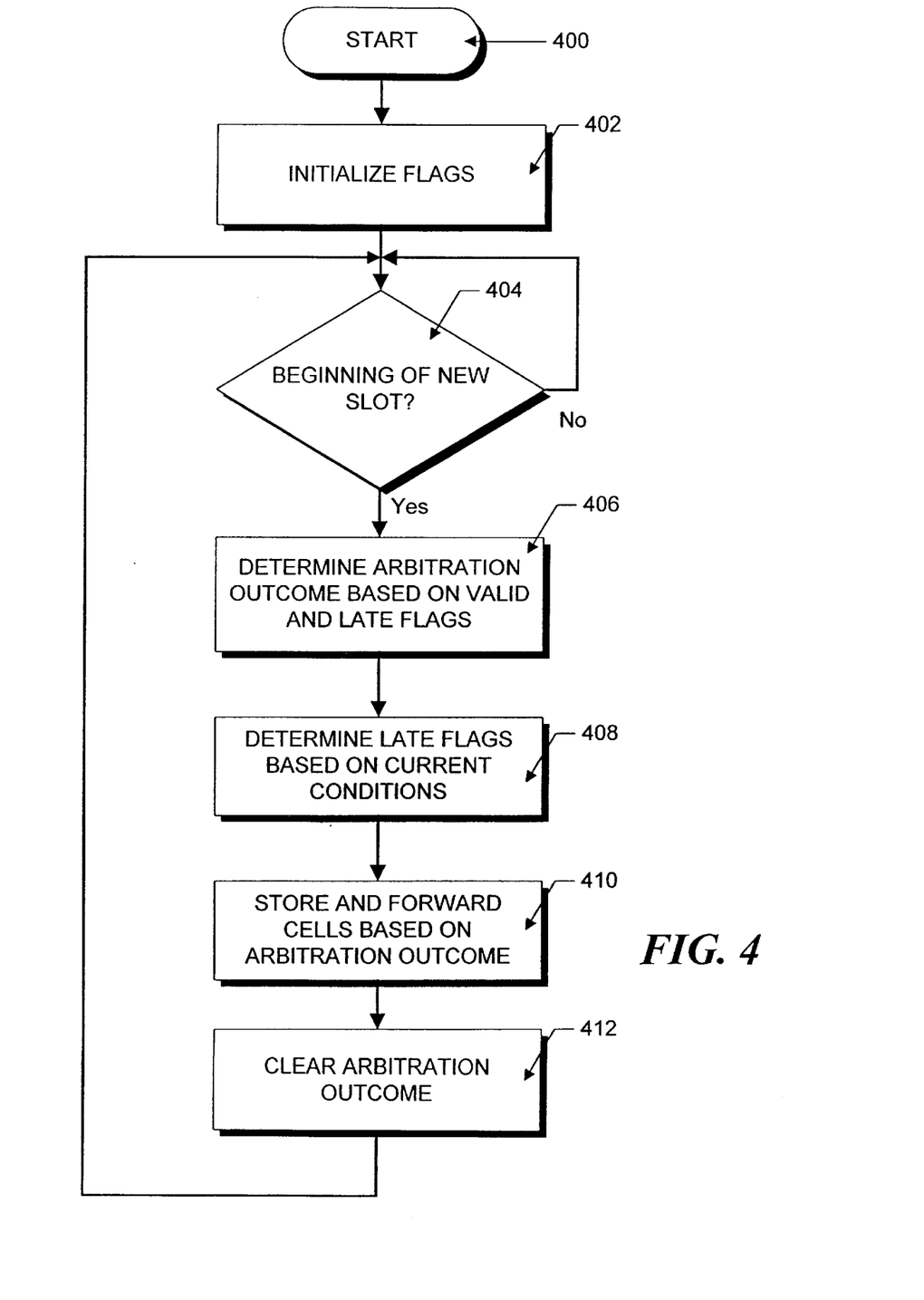
FIG. 4 is a flowchart illustrating the port arbitration processing in accordance with the principles of the present invention.

The basic arbitration process is illustrated in the flowchart in FIG. 4. The arbitration process begins in step 400 and proceeds to step 402 in which all arbitration flags are cleared to start operation. Then, at step 404, the process waits for the beginning of a new machine slot time. Cell arrival is recognized at the beginning of a time slot; thus, the conditions of the input flags 1_cv and 2_cv are updated by the respective controllers at the beginning of a new time slot. State flags are updated during the slot time and carry status values until the next time slot.

If, in step 404, the beginning of a time slot is not detected, the process returns to step 404 to wait. Alternatively, if the beginning of a new time slot is detected in step 404, the process proceeds to step 406 in which an arbitration outcome is determined based on the 1_cv, 2_cv and "late" flags which will be discussed in detail below. After the arbitration outcome is determined, the late flags are updated. Arbitration outcome is determined first because the results of the arbitration can change the "late" status of buffered cells.

Next, in step 410, the store and forward operations are conducted based on the arbitration outcome. Finally, in step 412, all arbitration outcome flags are reset and the process loops back to step 404 to await the beginning of a new time slot.

The actual arbitration process is set forth in the pseudocode below. In this code, several boolean value internal flags are used. For controller 300, these flags include 1_RCV flag indicating a buffered A cell is ready for storing and 1_late flag indicating that a buffered A cell has been waiting for at least one machine slot time. For controller 302 the equivalent flags 2_RCV and 2_late are used. In addition, another flag, DBL_RCV, is used to indicate input congestion has been detected and a store/store cycle must be initiated.

---
ARBITRATION PSEUDOCODE
---

```
;Clear flags for beginning of processing
1_RCV:=0, 2_RCV:=0, DBL_RCV:=0, 1_late:=0, 2_late:=0
loop:
Wait:
IF (NOT beginning of new slot) then
    GOTO Wait
ELSE
    ;Begin slot processing
    ;Determine the arbitration outcome by means of the current cv and
    late flags
    1_RCV:=1_cv AND NOT (2_late AND 2_cv)
    2_RCV:=2_cv AND {(NOT 1_cv) OR
    (2_late AND 1_cv AND NOT 1_late)}
    DBL_RCV:=1_cv AND 1_late AND 2_cv AND 2_late ;Next determine the late flags for the next slot based on current
    conditions
    ;including the result of the arbitration
    IF (1_late =0) then
        1_late:=(2_late AND 1_cv AND 2_cv)
    ELSE
        1_late:=(1_cv OR 2_cv)
    ENDIF
    IF (2_late=0)then
        2_late:=(1_cv AND 2_cv)
    ELSE
        2_late:=(1_cv OR 2_cv)
    ENDIF ;Next, do the store and forward operations based on the arbitration
    outcome
    IF (1_RCV) then
        forward a cell
        store a cell from the selected buffer in controller 300
    ENDIF IF (2_RCV) then
        forward a cell
        store a cell from the selected buffer in controller 302
    ENDIF IF (DBL_RCV)
        store a cell from the selected buffer in controller 300
        store a cell from the selected buffer in controller 302
    ENDIF ;clear the arbitration flags for the next time slot
    1_RCV:=0
    2_RCV:=0
    DBL_RCV:=0

;repeat processing for next time slot
ENDIF
GOTO loop
```

---

This pseudocode is illustrative of code that can be used as an input to a synthesis tool, for example, SYNOPSYS™. With this input, the synthesis tool would then synthesize a gate-level circuit which would be used to perform the actual arbitration in the switch.

Figure 5:
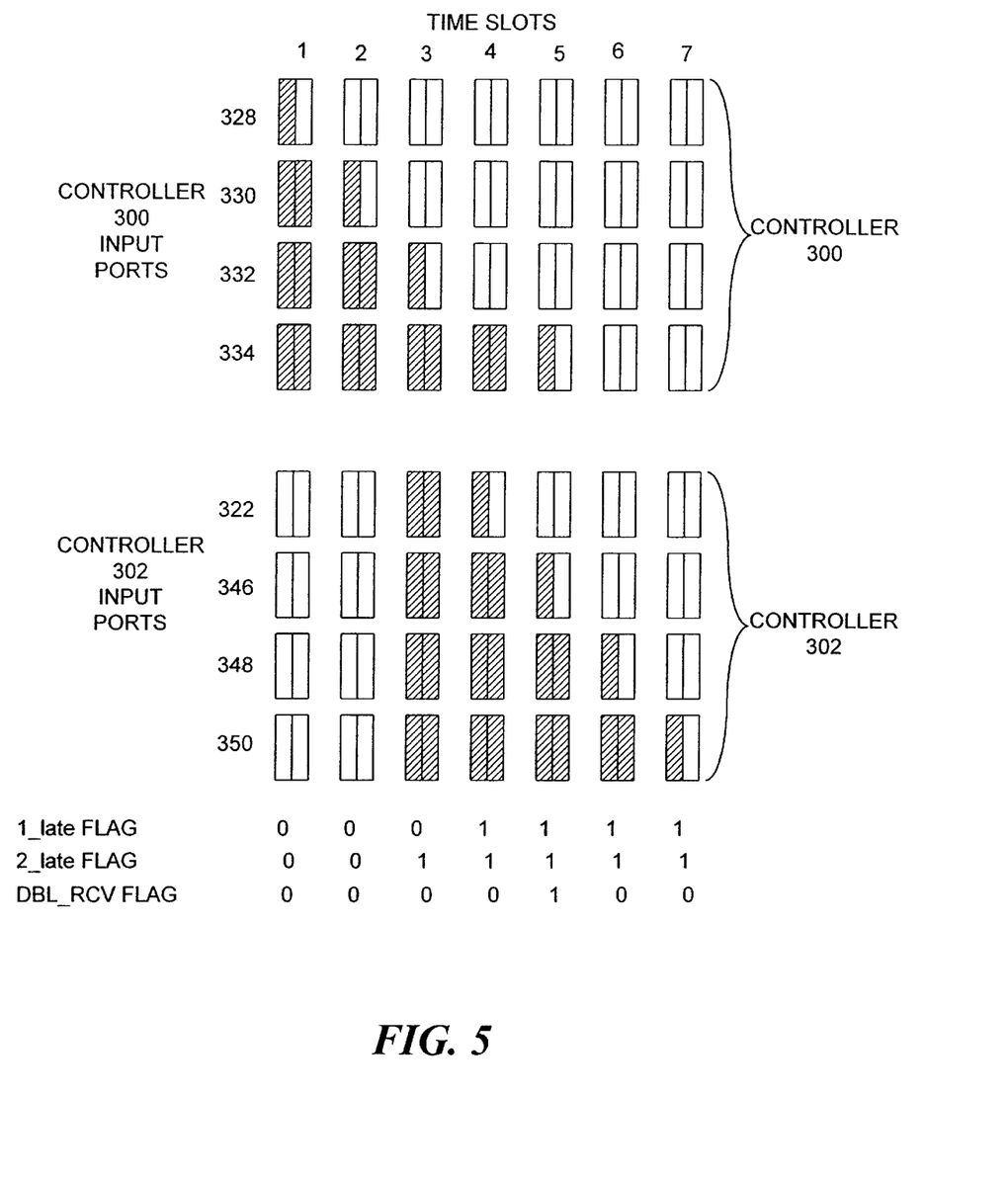
FIG. 5 is a schematic diagram illustrating incoming cell processing in one example input situation.

FIG. 5 illustrates the processing in accordance with the above pseudocode in a particular embodiment. In particular, in FIG. 5, the vertical columns represent seven consecutive time slots beginning with time slot 1 and ending with time slot 7. The upper four rows represent the four ports of controller 300 labeled 328, 330, 332 and 334. The four lower rows represent the four input ports of controller 302 labeled 344, 346, 348 and 350. Each box represents that state of the A FIFO cell of a port. The left half of the box represents the condition of the A cell buffer at the beginning of the time slot and the right half represents the condition of the A cell buffer after a store operation has been performed. A shaded half indicates that a cell is buffered and waiting to be stored and a clear half indicates that the buffer is clear.

As can be seen in FIG. 5, the boxes represent the situation where four cells arrive simultaneously at the four input ports of controller 300 in time slot 1 and four cells arrive simultaneously at the four input ports of controller 302 in time slot 3. During the first time slot, the cell buffered in input port 328 of controller 300 is stored and a cell is forwarded. Similarly, in time slot 2, the cell buffered in port 330 of controller 300 is stored and a cell is forwarded. Operation would continue in this manner until all four cells were stored and four cells were forwarded.

However, the arrival of four cells in controller 302 in time slot 3 changes matters. During time slot three, the first of the buffered cells in controller 302 on port 344 is stored and a cell is forwarded. However, the arbitration logic is determining that an input congestion condition is developing as indicated by the assertion of the 2_late flag in time slot 3. In time slot 4, the cell buffered in input port 332 of controller 300 is stored and a cell is forwarded, but by now both the 1_late and 2_late flags have been set. The result is that in time slot 5, in accordance with the principles of the invention, the DBL_RCV flag is set causing the buffered cell on port 334 of controller 300 to be stored and the buffered cell in port 346 to be stored so that no cell is forwarded in this time slot.

Subsequently, in time slots 6 and 7, the process reverts back to the normal process and the buffered cells in ports 348 and 350 of controller 302 are stored and two cells are forwarded. From FIG. 5, it can be seen that the buffers of each input port are filled for no longer than five time slots. Since five time slots elapse before a new cell can arrive on an input port, each buffer will be empty to receive a new cell if one should arrive.

Figure 6:
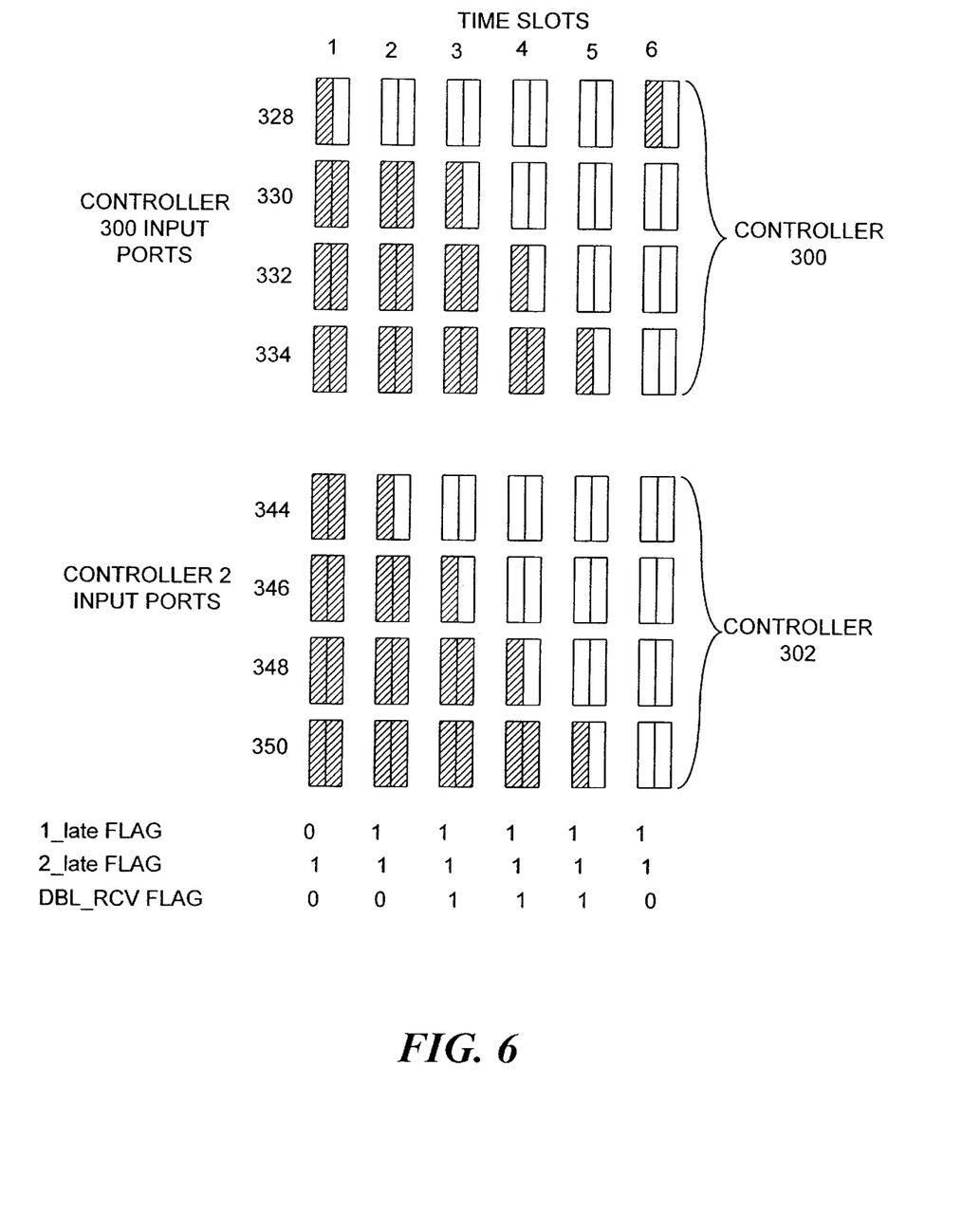
FIG. 6 is a schematic diagram illustrating incoming cell processing in a second example input situation.

FIG. 6 represents that worst case condition in which cells arrive on all four ports of controller 300 and on all four ports of controller 302 at the same time. During time slot 1 the buffered cell on input port 328 is stored and a cell is forwarded. Similarly, due to the round robin arbitration between ports in time slot 2, a buffered cell is forwarded from port 344 of controller 302 and a cell is forwarded. By this time, the arbitration circuitry has recognized an input congestion problem as indicated by the assertion of the 1_late and 2_late flags.

In time slot 3, the DBL_RCV flag is asserted causing buffered cells in ports 330 and 346 to be stored and no cell forwarded. The DBL_RCV flag continues to be asserted so that cells are stored in ports 332 and 348 in time slot 4 and from ports 334 and 350 in time slot 5. Again, it can be seen that each buffer is emptied within five time slots so that a new incoming cell, for example a cell arriving in port 328 in time slot 6 will have a free buffer and will not be lost.

In summary, when input congestion is detected, it is detected prior to cell loss and the memory arbitration process changes. The output process "shares it's bandwidth" with the input process so that the throughput of the switch can be less than the peak possible aggregate input data rate based on the number of input ports while minimizing the possibility of data loss. Further, the shared memory can be used to "smooth out the peaks" and lossless operation at higher utilization is possible. Consequently, lower performance memory subsystems can be used to reduce design cost.

A very important aspect of this invention is that, by absorbing the input bursts, it allows flow control protocols the time needed to respond to network traffic conditions and reduce the offered load. Flow control protocols are common and have varying response times. Highly effective protocols, such as FLOW MASTER®, a protocol developed by Digital Equipment Corporation, still require a switch to absorb many cells at the maximum (peak) rate while the protocol reduces the offered load. The invention allows a switch to have reduced throughput without disruption of these protocols. The same design, without the invention, would routinely lose cells when the offered load approached the peak load due to the bursty nature of traffic patterns.

Although only one illustrative embodiment has been disclosed, other embodiments will be apparent to those skilled in the art. For example, although the invention has been disclosed in the context of a shared memory switch, it can also be used with other data transfer devices, such as other switch designs and routers. The other main style of switch design for ATM switching networks is a hardware crossbar switch. Hardware crossbar switches may employ the invention as a means to increase port count beyond the limit imposed by the crossbar bandwidth. In addition, packet switches and routers used in traditional LAN networks which use shared-memory switch designs could also benefit from the invention.

Similarly, although one of the illustrated embodiments has input FIFOs with a single B buffer section, it is also possible to use an input FIFO allowing more than one cell to be stored of type B. In this case the inventive bandwidth sharing technique can be invoked only after a set number of cells arrive. Moreover, the above embodiments refer to an ATM switch which operates with cells of 53 bytes in length, but the invention is equally applicable to devices having data "packets" of other lengths as well. These modifications and others which will be apparent to those skilled in the art are intended to be covered by the following claims.

What is claimed is:

1. Apparatus for use in a data transfer device which accepts data at an input data rate, the apparatus comprising:
    a memory having an input bandwidth, an output bandwidth and a memory throughput which is the average of the input and the output bandwidths;
    means for detecting when the input data rate exceeds the memory throughput; and
    an arbitration means for cooperatively controlling with the detecting means the memory input bandwidth and the memory output bandwidth, the arbitration means temporarily increasing the memory input bandwidth and decreasing the memory output bandwidth by modifying at least one of data transfer cycles of the memory when the input data rate exceeds the memory throughput.

2. Apparatus for use in a data transfer device which accepts data at an input data rate, the apparatus comprising:
    a shared memory having an input bandwidth, an output bandwidth and a memory throughput which is the average of the input and the output bandwidths;
    a plurality of input port buffers for temporarily storing data arriving over a communications network and providing the data to the memory;
    a detection mechanism, responsive to the data stored in the input port buffers, and arranged to detect when the input data rate exceeds the memory throughput; and
    an arbitration mechanism, responsive to the detection mechanism, arranged to temporarily increase the memory input bandwidth and decrease the memory output bandwidth by modifying at least one of data transfer cycles of the memory when the input data rate exceeds the memory throughput.

3. Apparatus according to claim 2 wherein the detection mechanism is further arranged to detect when data cells are present in one of the plurality of input port buffers for at least two consecutive ones of the plurality of data transfer cycles.

4. Apparatus according to claim 2 wherein the arbitration mechanism is constructed to store one data cell and forward one data cell in each of a plurality of data transfer cycles when the input data rate is less than the memory throughput
    and wherein the arbitration mechanism constructed to store two data cells in at least one of the plurality of data transfer cycles when the input data rate exceeds the memory throughput.

5. Apparatus for use in a network data transfer device which accepts data arriving over a communications network at an input data rate and includes a memory that transfers data in a plurality of consecutive data transfer cycles providing an input bandwidth, an output bandwidth and a memory throughput which is the average of the input and output bandwidths, the memory being constructed and arranged to typically execute said data transfer cycles by storing one data cell in the memory and subsequently by forwarding one data cell from the memory to transfer data through the device thus realizing the memory throughput, the apparatus comprising:
    a detection mechanism arranged to detect when the input data rate exceeds the memory throughput; and
    an arbitration mechanism arranged to cooperate the detection mechanism and temporarily change the data transfer cycle to store subsequently two data cells in at least one of the data transfer cycles when the input data rate exceeds the memory throughput.

6. Apparatus according to claim 5 wherein the network data transfer device has a plurality of input port buffers for temporarily storing data cells and the detection mechanism is responsive to data cells stored in the input port buffers.

7. Apparatus according to claim 6 wherein the detection mechanism is further arranged to detect when data cells are present in one of the plurality of input port buffers for at least two consecutive ones of the data transfer cycles.

8. Apparatus for reducing cell loss in a network node shared memory cell switch has a shared memory with an input bandwidth, an output bandwidth and a memory throughput which is the average of the input and output bandwidths and which operates in a plurality of consecutive data transfer cycles, a typical one of said data transfer cycles comprising one data cell being stored in the memory and one data cell being forwarded from the memory to transfer data through the device, the apparatus comprising:
    means for determining an input data rate;
    means, responsive to the input data rate, for detecting when the input data rate exceeds the memory throughput; and
    an arbitration means for cooperating with the detecting means and for temporarily changing the typical data transfer cycle by storing subsequently two data cells in at least one of the data transfer cycles when the input data rate exceeds the memory throughput.

9. Apparatus according to claim 8 wherein the shared memory switch has a plurality of input port buffers for temporarily storing data cells and the determining means detects data cells temporarily stored in the input port buffers for determining the input data rate.

10. Apparatus according to claim 9 wherein the detecting means detects when data cells are present in one of the plurality of input port buffers for at least two consecutive ones of the plurality of data transfer cycles.

11. A method for use in a data transfer device which accepts data arriving over a communications network at an input data rate and has a memory with a plurality of consecutive data transfer cycles, an input bandwidth, an output bandwidth and a memory throughput which is the average of the input and output bandwidths, the method comprising the steps of:

A. detecting when the input data rate exceeds the memory throughput; and

B. temporarily increasing the memory input bandwidth and decreasing the memory output bandwidth by modifying at least one of data transfer cycles of the memory when the input data rate exceeds the memory throughput as detected in step A.

12. A method according to claim 11 wherein the data transfer device has a plurality of input port buffers for temporarily storing data cells and step A comprises the step of:

A1. detecting when the input data rate exceeds the memory throughput by examining data cells stored in the input port buffers.

13. A method according to claim 12 wherein step A1 comprises the step of:

A1 a. detecting when data cells are present in one of the plurality of input port buffers for at least two consecutive ones of the plurality of data transfer cycles.

14. A method according to claim 11 wherein step B comprises the step of:

B1. storing subsequently two data cells in at least one of the plurality of data transfer cycles when the input data rate exceeds the memory throughput.

15. A method for reducing cell loss in a network node shared memory cell switch has a plurality of input port buffers for temporarily storing data cells arriving over a communications network, and a shared memory which operates in a plurality of consecutive data transfer cycles, typical one of said data transfer cycles comprising one data cell being stored in the memory and one data cell being forwarded form the memory to transfer data through the device, the method utilizing a late flag and, for each data transfer cycle, comprising the steps of:

A. monitoring the input port buffers to detect when at least one data cell is stored therein at the beginning of a data transfer cycle;

B. determining a first and second data cell which may be stored by means of the data cells detected in step A using a predetermined arbitration algorithm;

C. determining the late flag value for a next data transfer cycle based on the data cells detected in step A and the data cells determined in step B;

D. forwarding a third data cell and storing the first data cell determined in step B when the late flag is not set; and E. storing the first and the second data cells determined in step B when the late flag is set.

16. A method for reducing cell loss in a network node shared memory cell switch according to claim 15 wherein step C comprises the step of:

C1. setting the late flag when at least two data cells are detected in one of the input port buffers and at least one data cell is detected in another of the input port buffers at the beginning of a data transfer cycle.

17. A method for reducing cell loss in a network node shared memory cell switch according to claim 15 wherein step C comprises the step of:

C2. clearing the late flag when no data cells are detected in the input port buffers at the beginning of a data transfer cycle.

18. A computer program product for use in a data transfer device which accepts data arriving over a communications network at an input data rate and has a shared memory having an input bandwidth, an output bandwidth and a memory throughput which is the average of the input and output bandwidths, the computer program product comprising a computer usable medium having computer readable program code thereon, the computer readable program code including:

program code for detecting when the input data rate exceeds the memory throughput; and program code which controls the memory input bandwidth and the memory output bandwidth to temporarily increase the memory input bandwidth and decrease the memory output bandwidth by modifying at least one of data transfer cycles of the memory when the input data rate exceeds the memory throughput.

19. A computer program product according to claim 18 wherein the data transfer device has a plurality of input port buffers for temporarily storing data cells and the detecting program code comprises:

program code for examining data cells stored in the input port buffers to detect when the input data rate exceeds the memory throughput.

20. A computer program product according to claim 19 wherein the data transfer device has a plurality of consecutive data transfer cycles, wherein a typical one of said data transfer cycles comprising one data cell being stored in the memory and one data cell being forwarded from the memory to transfer data through the device, and wherein the examining program code comprises:

program code for detecting when data cells are present in one of the plurality of input port buffers for at least two consecutive ones of the plurality of memory cycles.

21. A computer program product according to claim 18 wherein one data cell is normally stored in the memory and one data cell is normally forwarded from the memory in each of a plurality of transfer cycles and wherein the program code which controls the memory input bandwidth and the memory output bandwidth and includes the modification of at least one of the data transfer cycles of the memory comprises:

program code for storing subsequently two data cells in at least one of the plurality of data transfer cycles.

22. A network node shared memory switch comprising:

one or more input ports, each input port for coupling to a network link, each input port constructed and arranged to accept data arriving over a communications network at an input data rate, the switch having an aggregate input data rate equal to the sum of a the input data rates of the one or more ports;

a shared memory having an input bandwidth, an output bandwidth, and a memory throughput which is the average of the input and output bandwidths;

a detection mechanism constructed and arranged to detect when the aggregate input data rate exceeds the memory throughput;

an arbitration mechanism constructed and arranged to cooperate with the detection mechanism when controlling the memory input bandwidth and the memory output bandwidth, the arbitration mechanism arranged to temporarily increase the memory input bandwidth and decrease the memory output bandwidth by modifying at least one of data transfer cycles of the memory when the aggregate input data rate exceeds the memory throughput.

23. Apparatus for use in a data transfer device which accepts input data arriving over a communications network at an input data rate, comprising:

a shared memory having an input bandwidth, an output bandwidth, and a memory throughput which is the average of the input and the output bandwidths;

a detection mechanism constructed and arranged to detect when the input data rate exceeds the memory throughput;

an arbitration mechanism constructed and arranged to cooperate with the detection mechanism when controlling the memory input bandwidth and the memory output bandwidth, the arbitration mechanism being constructed and arranged to use data transfer cycles of the memory providing the memory input bandwidth substantially equal to the memory output bandwidth, the arbitration mechanism being further arranged to temporarily increase the memory input bandwidth and decrease the memory output bandwidth by modifying at least one of the data transfer cycles when the input data rate exceeds the memory throughput.

24. The network node shared memory switch of claim 22 wherein each input port includes a FIFO input port buffer constructed and arranged to temporarily store the data.

25. The network node shared memory switch of claim 22 wherein the detection mechanism is constructed and arranged to monitor the data at a selected location of the FIFO input port buffer.

26. The network node shared memory switch of claim 24 wherein the FIFO input port buffer includes at least two buffer cells and the detection mechanism is constructed and arranged to monitor cell occupancy of the FIFO input port buffer.

27. The network node shared memory switch of claim 24 wherein the FIFO input port buffers are arranged into two FIFO groups, each FIFO group being associated with an input controller.

28. The network node shared memory switch of claim 27 wherein the arbitration mechanism is further constructed to receive input from each said input controller.

29. The network node shared memory switch of claim 27 further including a speed matching FIFO connected to an output of the FIFO group.

* * * * *